(12) United States Patent
Fakonas

(10) Patent No.: US 7,772,737 B1
(45) Date of Patent: Aug. 10, 2010

(54) TWO CONDUCTOR WINDING FOR AN INDUCTION MOTOR CIRCUIT

(75) Inventor: Anastassios B. Fakonas, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 38 days.

(21) Appl. No.: 12/392,404

(22) Filed: Feb. 25, 2009

(51) Int. Cl.
H02K 1/00 (2006.01)
(52) U.S. Cl. ........................... 310/198; 310/180
(58) Field of Classification Search ........... 310/195, 310/198, 199, 180
See application file for complete search history.

(56) References Cited

U.S. PATENT DOCUMENTS

| | | | |
|---|---|---|---|
| 3,324,371 A | 6/1967 | Stauffer | |
| 3,488,569 A | 1/1970 | Allendorph et al. | |
| 3,843,945 A * | 10/1974 | Koning | 335/217 |
| 3,942,055 A | 3/1976 | Hoffmeyer | |
| 4,100,444 A | 7/1978 | Boyd, Jr. | |
| 4,107,583 A | 8/1978 | Houtman | |
| 4,880,391 A | 11/1989 | Hurtgen | |
| 6,114,790 A | 9/2000 | Fei | |
| 7,489,055 B2 * | 2/2009 | Jeong et al. | 310/15 |
| 2009/0214363 A1 | 8/2009 | Noh et al. | |

* cited by examiner

*Primary Examiner*—Nguyen N Hanh
(74) *Attorney, Agent, or Firm*—Maginot, Moore & Beck LLP

(57) ABSTRACT

An electrical induction motor has a main winding formed with two electrical conductors having different electrical resistivities. The motor includes a stator having a structure about which a winding is formed, and the winding includes a first electrical conductor having a first end and a second end, and a second electrical conductor having a first end and a second end, the first end of the first electrical conductor and the first end of the second electrical conductor being coupled together and the second end of the first electrical conductor and the second end of the second electrical conductor being coupled together to form a parallel circuit with the first electrical conductor and the second electrical conductor, and the second electrical conductor having an electrical resistivity that is greater than an electrical resistivity of the first electrical conductor. In one embodiment, the first electrical conductor is copper and the second electrical conductor is aluminum.

15 Claims, 1 Drawing Sheet

TWO CONDUCTOR WINDING FOR AN INDUCTION MOTOR CIRCUIT

TECHNICAL FIELD

This disclosure relates generally to asynchronous electrical motors and, more particularly, to the windings used in these motors.

BACKGROUND

Single-phase and three-phase motors are used in various applications. A single-phase motor may be comprised of a stator having a main and auxiliary winding and a rotor having electrical conductors formed in it. An electrical current is selectively provided through the windings to induce a secondary current in the rotor. The rotating magnetic field generated by the currents in the windings and rotor conductors rotate the rotor to generate torque on the output shaft of the rotor. A three-phase motor has three stator windings that are displaced by 120 degrees. In response to current phases flowing in the windings, an air gap flux induces current in the rotor conductors and generates torque on the rotor output shaft. The windings may be powered directly from an AC source or a DC inverter may be used to supply power at a required frequency and amplitude for a selected speed.

The stator windings are typically an insulated electrical conductor. Most commonly the stator has a slot structure in which the conductor is wrapped multiple times to form a winding. The gauge of the wire and the number of turns affect the output and efficiency of the motor. The slot in which the wire is wrapped is typically sized to accommodate a particular gauge wire for a predetermined number of turns. In motor manufacture, stators may be manufactured in large numbers for installation in electrical motors. One component of cost for a stator is the type of conductor used for the windings. Copper is frequently used, but as the cost of copper has increased significantly, the use of cheaper aluminum has grown. A problem with substituting aluminum for copper arises from the greater resistivity present in an aluminum wire in comparison with a copper wire of the same gauge. Consequently, the gauge of an aluminum wire needs to be larger in order for the aluminum wire to carry a current roughly the same magnitude as the copper wire being replaced. Unfortunately, the stator gap is typically too small to accommodate the number of turns of the larger aluminum wire. If the stator must be re-designed or modified to accept the larger gauge aluminum wire, then any savings from substituting aluminum for copper in a winding is virtually eliminated.

SUMMARY

An electrical induction motor has a main winding formed with two different electrical conductors. The motor includes a stator having a structure about which a winding is formed, and the winding includes a first electrical conductor having a first end and a second end, and a second electrical conductor having a first end and a second end, the first end of the first electrical conductor and the first end of the second electrical conductor are coupled together and the second end of the first electrical conductor and the second end of the second electrical conductor are coupled together to form a parallel circuit with the first electrical conductor and the second electrical conductor, and the second electrical conductor has an electrical resistivity that is greater than an electrical resistivity of the first electrical conductor. In one embodiment, the first electrical conductor is copper and the second electrical conductor is aluminum.

The motor may be made with a method that forms a motor winding with two electrical conductors having different electrical resistivities. The method includes coupling a first electrical conductor to a second electrical conductor to form a parallel circuit, the second electrical conductor having an electrical resistivity that is greater than an electrical resistivity of the first electrical conductor; and wrapping the first and the second electrical conductors about a gap of a set of slots in a stator to form a winding for an electrical motor.

BRIEF DESCRIPTION OF THE DRAWINGS

The foregoing aspects and other features of an electrical motor winding having two electrical conductors having different electrical resistivities that are coupled together in a parallel circuit to form the winding are explained in the following description, taken in connection with the accompanying drawings.

DETAILED DESCRIPTION

Figure 1:
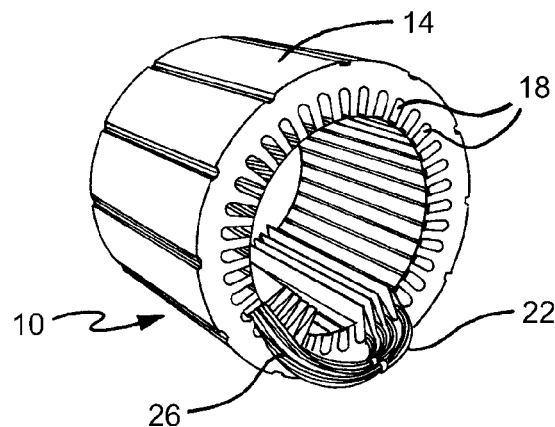
FIG. 1 is a perspective view of a stator and a winding in the stator.

A stator 10 which may be installed in a conventional electrical induction motor is shown in FIG. 1. The stator 10 is comprised of a plurality of thin laminations made of cast iron or aluminum. The laminations are bonded together to a form hollow stator core 14 having slots 18. A coil of an insulated wire 22 has been wound in a set of slots to form a winding 26. When an alternating current is applied to the winding 26, a rotating magnetic field is generated. This rotating magnetic field acts on a rotor in a known manner to generate torque at the output shaft of the rotor.

Figure 2:
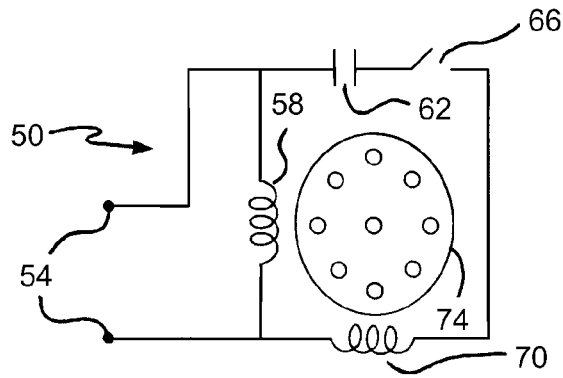
FIG. 2 is a circuit diagram of an induction motor with an auxiliary winding for starting the motor.

A circuit representative of a single-phase induction motor is shown in FIG. 2. The motor 50 includes input connections 54, a main winding 58, a capacitor 62, a centrifugal switch 66, a start or auxiliary winding 70, and a rotor 74. The main winding 58 and auxiliary winding 70 are wrapped in a set of stator slots as described above. The capacitor 62, centrifugal switch 66, and auxiliary winding 70 have been added because a motor with only a single winding is not self-starting. At the stopped position or low speeds, the centrifugal switch 66 is closed. In response to an alternating current being applied to the circuit, current through the main winding 58 lags behind the supply current because of the impedance of the main winding. Likewise, current through the start leg of the circuit, which includes the capacitor 62, switch 66, and winding 70, also lags the supply current from the impedance of the start leg. The magnetic fields generated by the main and the start windings produce a magnetic field that rotates in one direction. This magnetic field acts on the rotor to spin it. As the rotor approaches a predetermined speed, the centrifugal switch opens and the auxiliary winding no longer generates a magnetic field. Thereafter, the main winding continues to generate the rotating magnetic field through interaction with the rotor to continue rotation of the rotor.

In previously known induction motors, the main winding and the auxiliary winding may be formed from a copper wire wrapped in a set of stator gaps. The copper wire is wrapped in the stator slots for a plurality of turns to obtain a predetermined efficiency-turns and resistance for the winding. As the price of copper has increased, cheaper conductors were considered as substitutes for the copper used to form the windings. These cheaper conductors, however, did not have an electrical resistivity that was as low as copper. Consequently, the cheaper conductors required wires having a larger gauge than the copper wire being replaced in order to provide an efficiency and resistance equivalent to the efficiency-turns and resistance of the copper winding. For example, copper has an electrical resistivity of approximately 1.724 micro-ohms per cubic centimeter at a temperature of 20 degrees Celsius, while aluminum has an electrical resistivity of approximately 2.828 micro-ohms per cubic centimeter at a temperature of 20 degrees Celsius. Wrapping a larger gauge wire in the stator slots for an appropriate number of turns overfills the slots in the stator. Thus, either the slots needed to be increased in size or the rotor length requires increasing. Both types of changes are relatively expensive as they either require increased design and tooling costs, or increased material costs. Of course, these increased costs offset, at least partially, the expected savings from the substitution of the cheaper conductor material.

Figure 3:
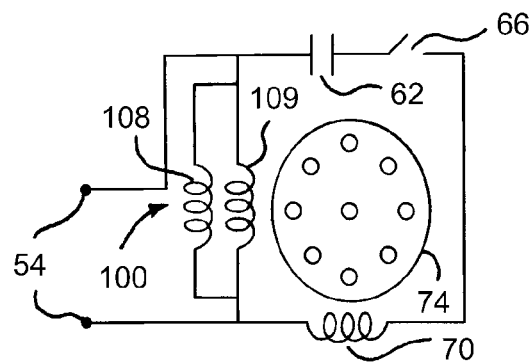
FIG. 3 is a circuit diagram of an induction motor having a main winding made from two dissimilar conductors.

To overcome these issues and preserve more of the potential cost savings arising from the substitution of a cheaper conductor for the winding, a new winding comprised of two electrical conductors having different electrical resistivities that are coupled to one another in a parallel circuit as been developed. The electrical schematic for a motor having the new winding is shown in FIG. 3. This schematic is the same as the one shown in FIG. 2 so the same references numbers have been used for components that are similar. The main winding 100, however, is comprised of two electrical conductors. One electrical conductor is an insulated copper wire 109 and the other conductor is an insulated aluminum wire 108. As shown in the figure, the two conductors are coupled to one another to form a parallel circuit. In order to make winding 100 have the equivalent efficiency-turns and resistance of the winding 58, which is being replaced by winding 100, the gauge of the copper wire forming winding 100 is reduced from the gauge of copper wire used to form winding 58. In one embodiment, winding 58 was formed with a 18 gauge copper wire that was wrapped with 24 turns, 37 turns, and 43 turns in three stator slots, while winding 100 was formed with a 21 gauge copper wire and a 19 gauge aluminum wire, which were coupled in parallel, and wrapped with 27 turns, 36 turns, and 42 turns in three stator slots. Even though more turns were required for equivalent efficiency-turns, the thinner conductors enabled the winding formed by the two conductors to fit within the same stator slots use to hold the winding 58. Moreover, the reduction in the amount of copper required for the winding 100 coupled with the reduced cost of the aluminum wire used in the winding 100 produced a cost savings of about 13% over the cost of the winding 58. Thus, the combination of the two electrical conductors having different resistivities that are coupled together in a parallel circuit provide a cheaper winding that fits within the stator slots of the original motor.

In the embodiment discussed above, a drop of three gauge sizes in the same length of copper wire resulted in one leg of the winding having one-half of the electrical resistance of the original winding 58. Consequently, the other half of the original winding 58 had to be provided by the aluminum wire. By increasing the gauge of the aluminum wire by two gauge sizes over the newly selected copper gauge wire, an electrical resistance equivalent to one-half of the original winding 58 could be obtained with a length of aluminum wire equal to the length of the smaller gauge copper wire. Other ratios of resistance between the two conductors, however, could be used as long as the electrical resistance presented by the parallel arrangement of the conductors was equivalent to the electrical resistance of the original winding made from a single metal conductor.

The construction of a main motor winding disclosed above may be used for other windings in a motor. For example, the auxiliary winding may also include two electrical conductors having different electrical resistivities that are coupled in a parallel circuit and wrapped about a stator slot. Similarly, one or more windings in a polyphase electrical motor may be likewise formed. Incorporating the winding construction disclosed above enables savings to be realized from the use of cheaper materials and a reduction in weight for the motor.

In operation, an existing motor design is evaluated for one or more new windings. A winding is selected and a thinner conductor of a first electrical resistivity is selected for the winding. A second conductor having an electrical resistivity that is different than the first conductor is selected. A resistance for each conductor is selected that yields a resistance that is equivalent to the resistance of the winding in the original design when the two conductors are coupled to one another in a parallel circuit. A length of each conductor is then determined from the resistance for each conductor and the two conductors are coupled to one another to form a parallel circuit. The two conductors are then wrapped in a set of slots in a stator for the original motor design. The motor may then be tested to verify the performance of the motor with the new winding is the equivalent of the original motor.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

I claim:

1. An electrical motor comprising:
   a stator having a structure about which a winding is formed; and
   the winding comprising:
   a first electrical conductor having a first end and a second end; and
   a second electrical conductor having a first end and a second end, the first end of the first electrical conductor and the first end of the second electrical conductor being coupled together and the second end of the first electrical conductor and the second end of the second electrical conductor being coupled together to form a parallel circuit with the first electrical conductor and the second electrical conductor, and the second electrical conductor having an electrical resistivity that is greater than the first electrical conductor.

2. The motor of claim 1 wherein the first electrical conductor is copper and the second electrical conductor is aluminum.

3. The motor of claim 1 wherein the first electrical conductor has a gauge size that is less than a gauge of the second electrical conductor.

4. The motor of claim 3 wherein the gauge size of the first electrical conductor is at least two gauge sizes smaller than the gauge size of the second electrical conductor.

5. The motor of claim 1 wherein an electrical resistance of the first electrical conductor is equal to the electrical resistance of the second electrical conductor.

6. The motor of claim 1 wherein the stator includes another structure about which another winding is formed; and the other winding comprising:

a third electrical conductor having a first end and a second end, and an electrical resistivity that is equal to the electrical resistivity of the first electrical conductor; and a fourth electrical conductor having a first end and a second end, the first end of the third electrical conductor and the first end of the fourth electrical conductor being coupled together and the second end of the third electrical conductor and the second end of the fourth electrical conductor being coupled together to form a parallel circuit with the third electrical conductor and the fourth electrical conductor, and the fourth electrical conductor having an electrical resistivity that is equal to the second electrical conductor.

7. The motor of claim 6 wherein the third electrical conductor is an insulated copper wire and the fourth electrical conductor is an insulated aluminum wire.

8. The motor of claim 6 wherein the third electrical conductor has a gauge that is smaller than a gauge of the fourth electrical conductor.

9. The motor of claim 6 wherein an electrical resistance of the third electrical conductor is equal to the electrical resistance of the fourth electrical conductor.

10. The motor of claim 6 wherein the gauge size of the first electrical conductor is at least two gauge sizes smaller than the gauge size of the second electrical conductor.

11. A method for constructing an electrical motor comprising:

coupling a first electrical conductor to a second electrical conductor to form a parallel circuit, the second electrical conductor having an electrical resistivity that is greater than an electrical resistivity of the first electrical conductor; and wrapping the first and the second electrical conductors within a set of slots in a stator to form a winding for an electrical motor.

12. The method of claim 11 wherein the first electrical conductor is an insulated copper wire and the second electrical conductor is an insulated aluminum wire.

13. The method of claim 11 wherein a gauge of the first electrical conductor is smaller than a gauge of the second electrical conductor.

14. The method of claim 11 wherein an electrical resistance of the first electrical conductor is equal to the electrical resistance of the second electrical conductor.

15. The method of claim 11 wherein the gauge size of the first electrical conductor is at least two gauge sizes smaller than the gauge size of the second electrical conductor.

* * * * *